Nov. 5, 1957

F. M. SMITH 2,812,394

CONTINUITY TESTER

Filed Jan. 3, 1955

Frank M. Smith
INVENTOR.

BY *(signatures)*
Attorneys

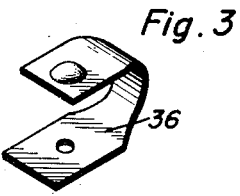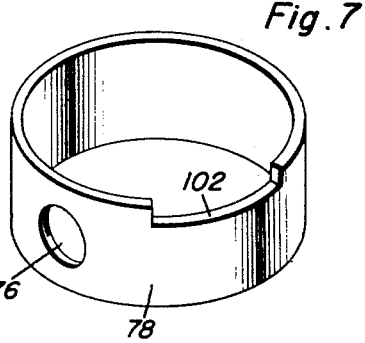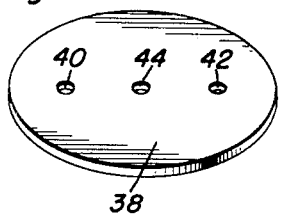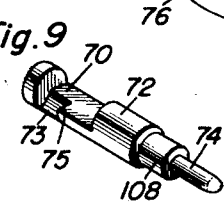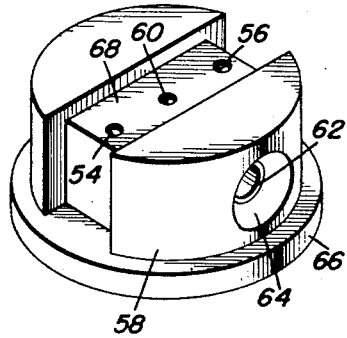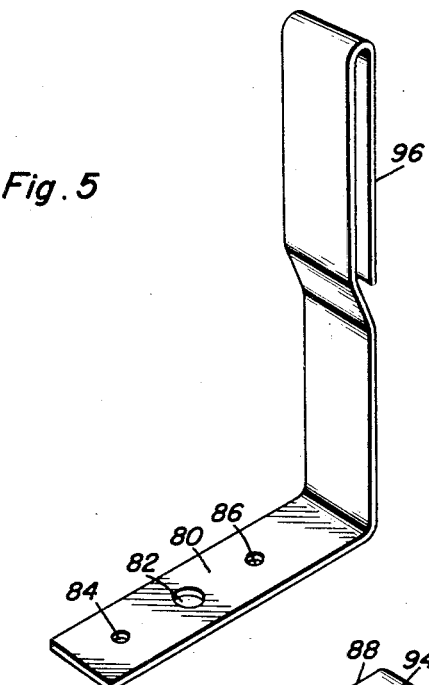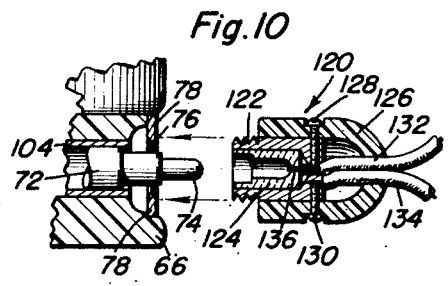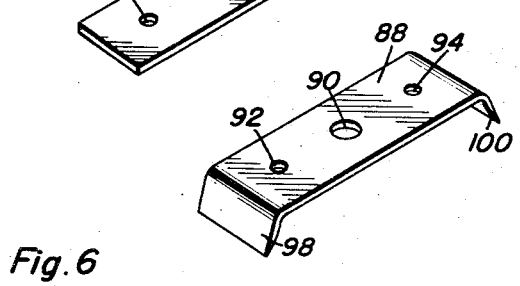

{ # United States Patent Office

2,812,394
Patented Nov. 5, 1957

2,812,394

CONTINUITY TESTER

Frank M. Smith, Grand Rapids, Mich.

Application January 3, 1955, Serial No. 479,517

2 Claims. (Cl. 200—60)

This invention relates to an electrical continuity test device adapted to be used in conjunction with a conventional flashlight for providing means for testing the continuity of switches, fuses and other low resistance electrical devices independent of any source of electrical supply outside of the flashlight's own low voltage battery circuit.

The construction of this invention features a novel arrangement whereby a contact is held in either an inner or outer position, the inner position of the contact enabling the flashlight to be used in the conventional manner while when the contact is in its extended position, the device is adapted to be utilized as a continuity tester.

An important object of the invention lies in the provision of means for compelting an operative electrical circuit from the sliding contact forming one of the elements of the invention to the electric lamp mounted in the flashlight so that the contact may be engaged with suitable apparatus being tested to thereby provide an indication of the proper operation of the device to be tested by the operation of the electric light bulb in the flashlight.

Still further objects and features of this invention reside in the provision of a continuity tester that is simple in construction, highly efficient in operation, capable of being easily suspended from a workman's belt or the like, leaving the hands of the user completely free, and which is highly efficient in operation.

These, together with the various ancillary objects and features of the invention which will become apparent as the following description proceeds, are attained by this continuity tester, a preferred embodiment of which has been illustrated in the accompanying drawings, by way of example only, wherein:

Figure 3 is a perspective view of the spring means utilized to engage the lower battery of the flashlight;

Figure 4 is a perspective view of the insulative disk positioned within the casing;

Figure 5 is a perspective view of the clip provided for attaching the continuity tester to the belt or like article of clothing of the user;

Figure 6 is a perspective view of a plate adapted to maintain contact between the switch ring and the casing;

Figure 7 is a perspective view of the switch collar;

Figure 8 is a perspective view of the base;

Figure 9 is a perspective view of the switch contact; and

Figure 10 is a sectional detail view illustrating the manner in which an extension lead connector is adapted to be secured within a threaded aperture in the switch collar and in engagement with the sliding contact.

Figure 1:
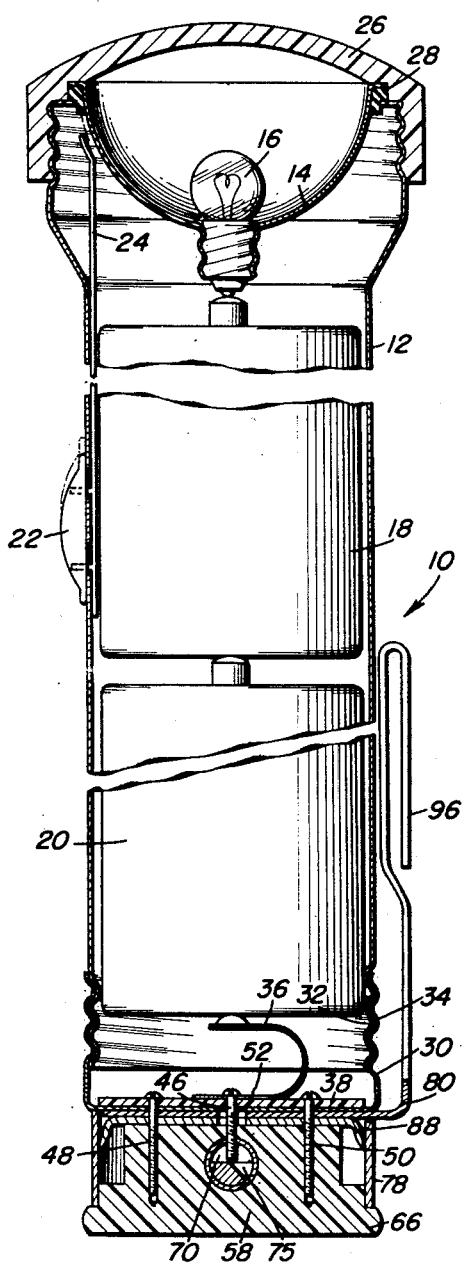
Figure 1 is a sectional detail view of the continuity tester comprising the present invention.

With continuing reference to the accompanying drawings wherein like reference numerals designate similar parts throughout the various views, numeral 10 generally designates the continuity tester comprising the present invention. This continuity tester 10 includes a conventional flashlight 12 having mounted therein a reflector 14, a lamp bulb in the reflector 14, as indicated at 16, batteries 18 and 20, and a control switch 22 for operating a contact 24 which is adapted to engage the reflector 14. A lens cover 26 may be provided, and it is noted that the reflector 14 is insulated from the casing by the conventional ring insulator 28. The casing 12 includes a base 30 threadedly received on the threaded end 32 of the casing, the base being provided with a threaded portion 34.

A resilient spring member 36 is mounted on an insulative disk 38 preferably formed of fiber or the like whose construction can be best seen in Figure 4. The disk 38 has apertures 40, 42 and 44 therethrough and extending through the aperture 44 pulling the spring contact 36 to the disk 38 is a fastener 46. Other fasteners 48 and 50 extend through the apertures 40 and 42 in contact with the base 30, while the fastener 46 is insulated and spaced from the base 30 by means of aperture 52.

The fasteners 48 and 50 are threadedly received within threaded apertures 54 and 56 in an insulative body 58, the insulative body 58 also being provided with a threaded aperture 60 opening into a recess 62 in the body 58, the recess having an enlarged mouth 64. The body 58 has a peripheral flange 66 and is provided with a central depressed portion 68.

The fastener 46 is threadedly engaged in the threaded aperture 60 in the base 58 to hold the spring 36 in position, and the end of the fastener 46 is adapted to engage within a groove 70 in a sliding contact 72 receivable in the recess or bore 62 in the insulative body 58. A further angulated slot 73 is also provided in sliding contact 72. The sliding contact 72, when rotated, will cause the shoulder 75 formed by the groove 73 to engage the fastener 46 to lock the sliding contact 72. The sliding contact 72 has a contact element 74 which is adapted to extend through a threaded opening 76 in a switch collar 78 rotatably mounted on the body 58 and held in position against the flange 66. An apertured clip member 80 having an enlarged aperture 82 through which the fastener 46 can pass without contacting the clip 80, and other apertures 84 and 86 through which the fasteners 48 and 50 extend are provided, and seated in the depressed portion 68 together with a collar contact retaining member 88 also provided with an aperture 90 through which the fastener 46 can extend without contacting the member 88 and other apertures 92 and 94. The clip is provided with an upper portion 96 forming a loop engageable over the belt or other garment of the user of this continuity tester while the member 88 is provided with outwardly extending end portions 98 and 100 for engaging the collar 78 to assure the completion of an operative electrical circuit to the collar 78. The collar 78 is provided with a cut-away portion as at 102 through which the clip 80 extends, the clip 80 therefore limiting the amount of rotation of the switch collar 78 through the difference in size of the cut-away portion 102 and the width of the clip 80. Positioned in the recess 62 which may be lined, as at 104, is a spring 106 which continuously urges the sliding contact 72 outwardly of the recess 62 with the fastener 46 restraining the contact in its movements. Carried by the contact element 74 in an insulative sleeve 108 which ensures the insulation of the contact element 74 from the opening 76 in the switch collar 78.

As is shown in Figure 10, the continuity tester may be provided with an adapter 120 which includes a socket 122 adapted to be threadedly engaged within the aperture 76 of the ring 78. An insulative fitting 124 forms a portion of the socket and is adapted to receive the contact element 74 therein. The adapter 120 is provided with an insulative casing 126 and suitable fasteners, at at 128 and 130 are provided for securing conductors 132 and 134 to the socket 130 and to the insert 124, as at 136, wherein the conductors 132 and 134 can be electrically engaged with the ring 78 and the contact element 74, respectively.

Figure 2:
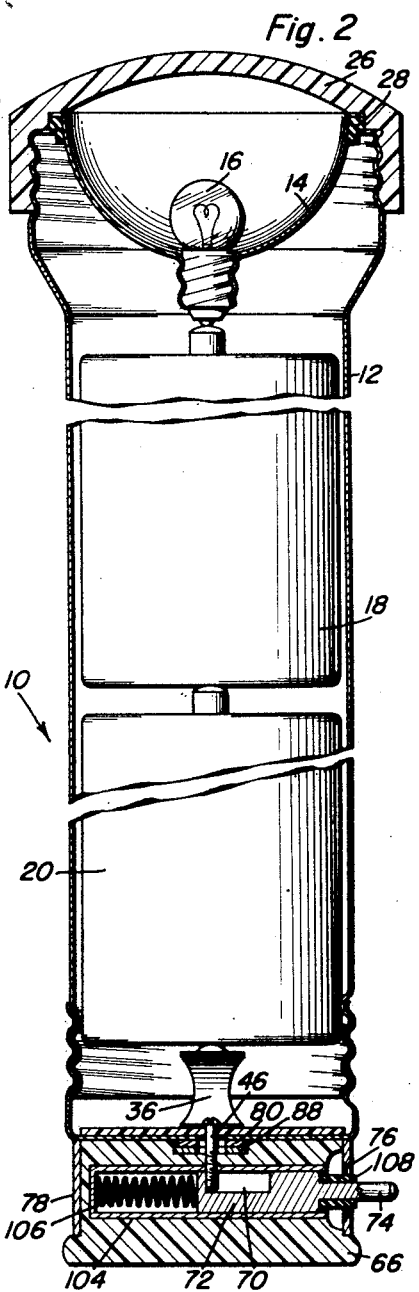
Figure 2 is another vertical sectional detail view of the invention as taken along a plane normal to the plane of Figure 1.

In use, and with the sliding contact 72 in an extended position as is shown in Figures 2 and 10, when the contact 74 is connected to the casing 12 by some electrical device to be tested, not shown, an operative electrical circuit will be provided from the lamp 16 through the reflector 14 and the switch contact 24 and the switch 22 to the casing 12, and from the casing 12 through the clip 80 and the member 88 to the ring 78 and from the casing or the ring 78 across the device to be tested to the contact 74. The electrical circuit is completed from the contact 74 and the fastener 46 through the spring 36 to the batteries 20 and 18 and back to the lamp 16. If, however, the sliding contact is held in a withdrawn position and with the ring 78 rotated so that the spring 106 urges the contact element 74 to abut the ring, the device will be capable of functioning as a flashlight when the switch 22 is operated. This is because an operative electrical circuit from the casing to the batteries will be completed through the ring 78 and the contact 74 to the batteries 20 and 18.

In order to test other electrical appliances, the conductors 132 and 134 may be operatively electrically connected to the device to be tested.

From the foregoing, the construction and operation of the device will be readily understood and further explanation is believed to be unnecessary. However, since numerous modifications and changes will readily occur to those skilled in the art, it is not desired to limit the invention, and accordingly all suitable modifications and equivalents may be resorted to, falling within the scope of the appended claims.

What is claimed as new is as follows:

1. A switch contact arrangement for use in a continuity testing device having a casing comprising an insulative body, a switch collar concentrically mounted on said body, said body having a recess therein, a sliding contact in said recess, said collar having an aperture therein through which said contact can extend, means electrically connecting said collar to said casing, a spring in said recess, said spring continuously urging said contact outwardly of said recess, another spring, a fastener secured to said another spring and extending through said casing spaced from said casing, said fastener engaging said contact, said contact having a groove therein, said fastener being engaged in said groove.

2. A switch contact arrangement for use in a continuity testing device having a casing comprising an insulative body, a switch collar concentrically mounted on said body, said body having a recess therein, a sliding contact in said recess, said collar having an aperture therein through which said contact can extend, means electrically connecting said collar to said casing, a spring in said recess, said spring continuously urging said contact outwardly of said recess, another spring, a fastener secured to said another spring and extending through said casing spaced from said casing, said fastener engaging said contact, said contact having a groove therein, said fastener being engaged in said groove, and means for limiting the rotation of said switch collar.

References Cited in the file of this patent
UNITED STATES PATENTS

| Number | Name | Date |
|---|---|---|
| 1,696,266 | Coote | Dec. 25, 1928 |
| 1,845,764 | Pryor | Feb. 16, 1932 |
| 2,076,495 | Bellamy | Apr. 6, 1937 |
| 2,225,936 | Williams | Dec. 24, 1940 |
| 2,256,129 | Tainer | Sept. 16, 1941 |
| 2,503,287 | Moore | Apr. 11, 1950 |
| 2,519,294 | Schneider | Aug. 15, 1950 |